INVENTOR.
THOMAS L. FAWICK
BY
YOUNT, RANEY, FLYNN & TAROLLI
ATTORNEYS

July 2, 1968  T. L. FAWICK  3,390,745
SELF-ENERGIZING, FLUID-OPERATED DRUM BRAKE
WITH CAM-OPERATED PARKING BRAKE MECHANISM
Filed Oct. 19, 1966  5 Sheets-Sheet 2

INVENTOR.
THOMAS L. FAWICK
BY
YOUNT, RANEY, FLYNN & TAROLLI

ATTORNEYS

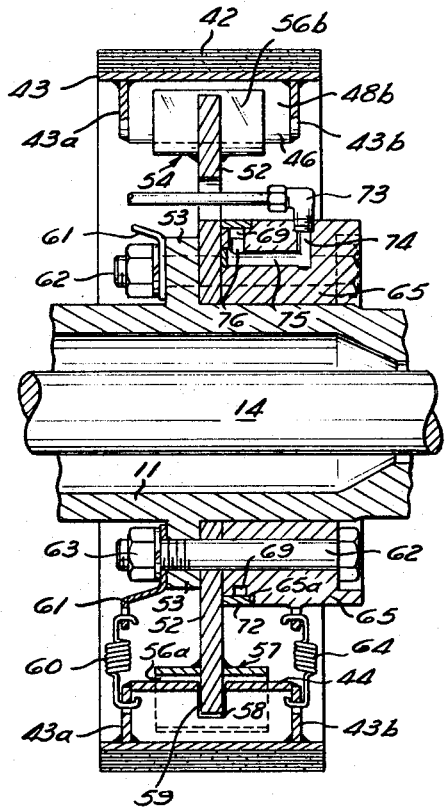
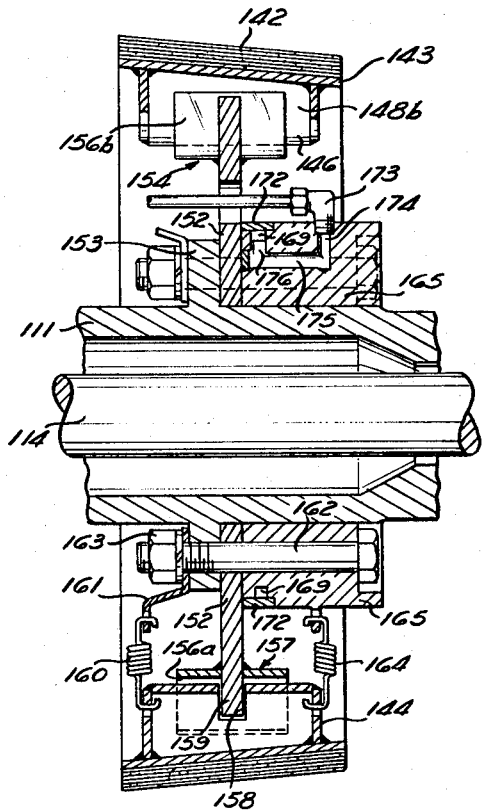
Fig. 4
Fig. 6

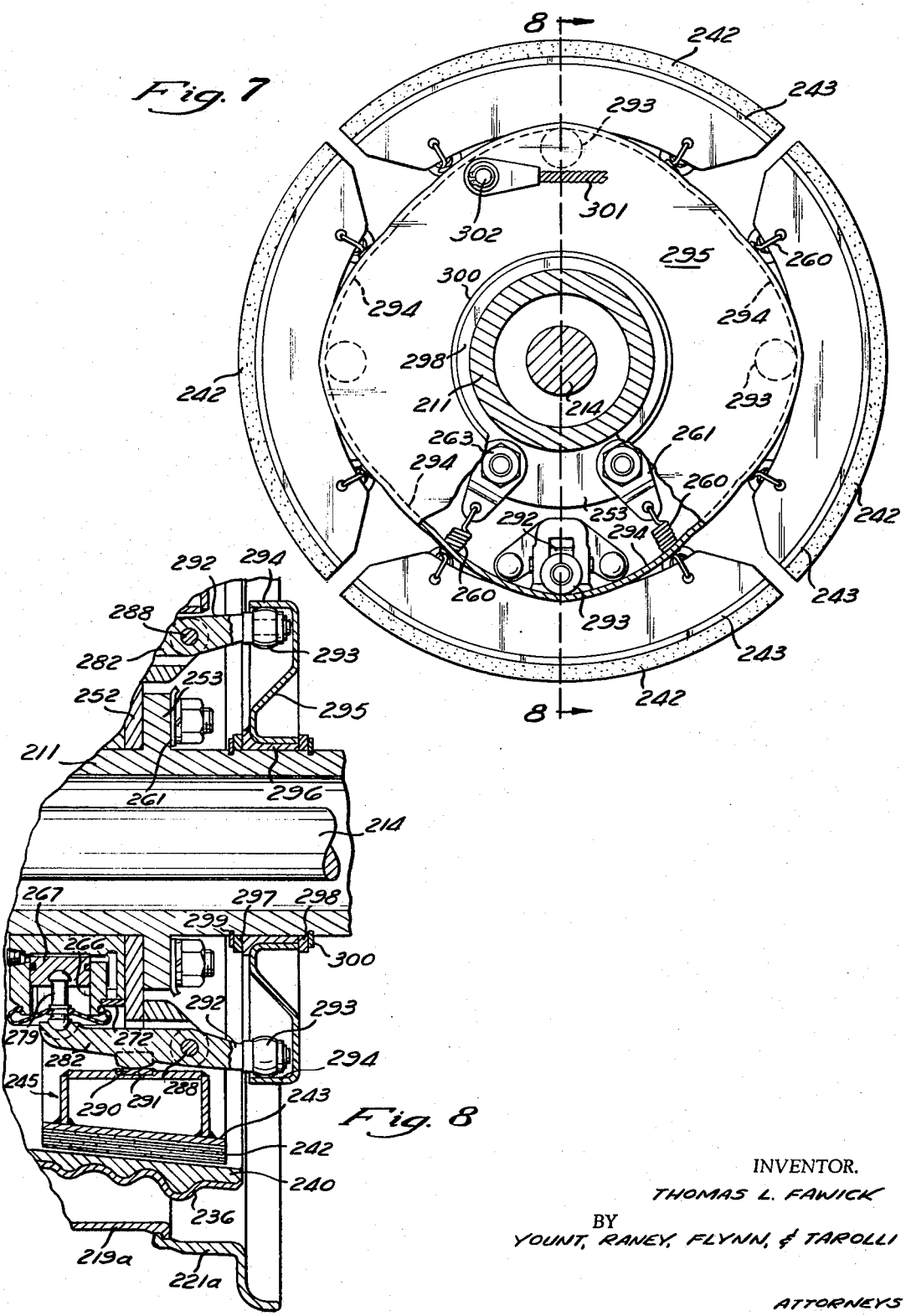

United States Patent Office 3,390,745
Patented July 2, 1968

3,390,745
SELF-ENERGIZING FLUID-OPERATED DRUM
BRAKE WITH CAM-OPERATED PARKING
BRAKE MECHANISM
Thomas L. Fawick, Shaker Heights, Ohio
(Hotel Statler-Hilton, Cleveland, Ohio 44101)
Filed Oct. 19, 1966, Ser. No. 587,733
11 Claims. (Cl. 188—106)

ABSTRACT OF THE DISCLOSURE

The present fluid-operated drum brake has a reaction plate for attachment to the wheel axle which has circumferentially-spaced V-shaped recesses facing outward toward the brake drum. Each brake shoe has several V-shaped lugs at the inside which are slidably received in these recesses for self-energizing action when the brake is applied. The brake shoes are operated by pistons slidable in radial cylinder bores formed in an annular body which fits over the outside of the axle. These cylinder bores are all connected to a circumferential passage on the outside of the body which is closed by a ring. A rotatable cam is provided for applying the brake when parking the vehicle.

---

This invention relates to a fluid-operated drum brake, particularly for vehicles, such as trucks or passenger cars.

One important object of the present invention is the provision of a novel and improved brake which provides frictional engagement of the brake shoes against the brake drum over substantially the entire circumferential extent of the brake drum for improved braking action.

Another object of this invention is to provide an improved brake having a novel arrangement for distributing the braking force substantially evenly over the entire circumferential extent of each brake shoe.

Another object of this invention is to provide such a brake which has a novel arrangement for providing self-energizing braking action of each brake shoe against the brake drum.

Another object of this invention is to provide such a brake having a novel and improved parking brake mechanism which is associated with the hydraulically-operated parts of the brake in a novel and advantageous manner.

Further objects and advantages of this invention will be apparent from the following detailed description of certain presently-preferred embodiments, which are illustrated in the accompanying drawings.

In the drawings:

FIGURE 4 is a longitudinal section through this brake taken along the line 4—4 in FIG. 2;

FIGURE 6 is a view similar to FIG. 4 and showing details of this second embodiment of the present brake;

FIGURE 7 is an end elevational view of a parking brake mechanism in the present brake; and FIGURE 8 is a fragmentary longitudinal section through this parking brake mechanism and the associated parts of the hydraulically-operated brake mechanism.

Figure 1:
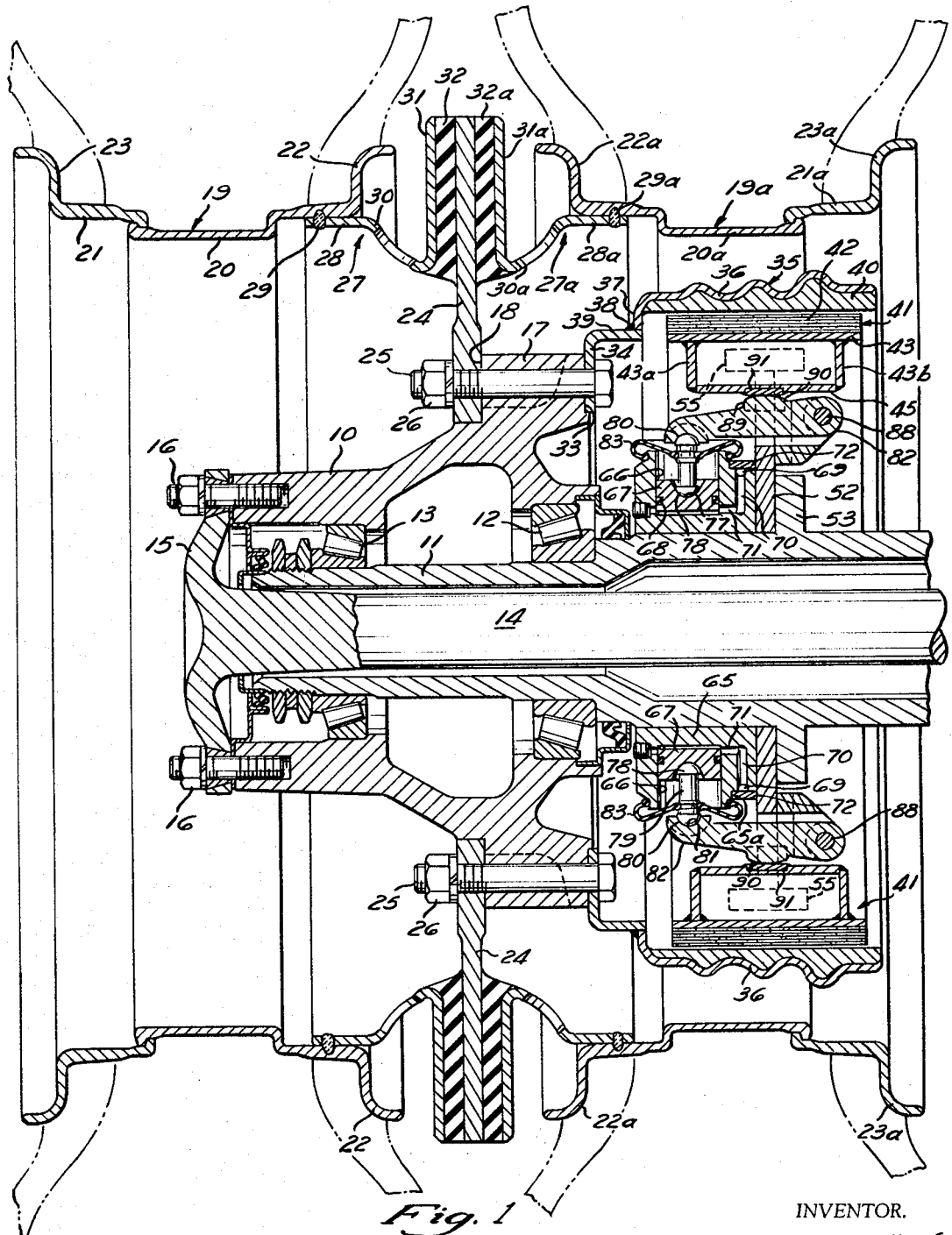
FIGURE 1 is a longitudinal section through a first embodiment of the present brake, shown associated with a dual wheel on a truck.

Referring to FIG. 1, the first embodiment of the present brake is shown mounted on a dual truck wheel which includes resiliently deformable parts adapting it for use with radial ply truck tires, which are more rigid than truck tires with conventional cord reinforcement constructions.

The wheel comprises a rigid, annular, inwardly disposed hub 10 which is rotatably mounted on a stationary hollow axle 11 of the truck by a pair of axially spaced roller bearings 12 and 13. A rotatable drive shaft 14 extends freely through this axle and has an annular flange 15 at its axially outward end which is attached to the outer end of the wheel hub 10 by a plurality of circumferentially spaced bolt and nut assemblies 16.

The hub 10 of the wheel has an annular radially disposed flange 17 at its outer periphery which presents an axially outwardly-facing, annular recess 18.

The wheel also includes a pair of axially spaced, rigid, annular rims 19 and 19a for receiving respective tires (shown partially in phantom). The axially outboard rim 19 is of two-piece construction, comprising a main annular rim member 20 and an annular end piece 21 which is snapped over member 20. These two pieces of rim 19 present respective curved, annular, end flanges 22 and 23, respectively, against which the respective beads of the tire seat. The axially inboard rim 19a is a mirror image of the outboard rim 19, with similar parts having the same reference numerals plus an "a" suffix.

The wheel has a resilient coupling unit acting between the hub 10 and the rims 19 and 19a. This resilient coupling unit includes a rigid, annular, radially disposed mounting plate 24 which is snugly received in the recess 18 on the outer flange 17 of the wheel hub 10 and is rigidly attached to this flange by bolts 25 and nuts 26. This coupling unit also includes a rigid, annular, rim support member 27 having a cylindrical end 28 which fits snugly inside the axially inward end of the main rim member 20 of rim 19 and is welded at 29 to the latter. The rim support member 27 has an annular connecting wall 30 which is inclined axially and radially inward from its cylindrical end 28, and an annular, radially extending wall 31 which is spaced axially inward from the outboard rim 19. The coupling unit also includes a one-piece annular body 32 of rubber or rubber-like material which is sandwiched between the wall 31 on rim support member 27 and the mounting plate 24, being secured to both of them by vulcanized adhesion or any other suitable bonding.

The inboard rim 19a of the dual wheel is similarly attached to a rim support member 27a, which is a mirror image of the rim support member 27, with corresponding parts being given the same reference numerals, with an "a" suffix added. An annular body 32a of rubber or rubber-like material is bonded to both the mounting plate 24 and the end wall 31a of this rim support member 27a.

Both rubber-like bodies 32 and 32a in this resilient coupling unit have an appreciable extent radially and axially, so that they can deform resiliently under any road shocks which may be imparted to the respective tire rims 19 and 19a.

The outer flange 17 on the wheel hub 10 presents an axially inwardly facing, annular recess 33 which provides a seat for a radially disposed, annular end flange 34 on the brake drum 35. Preferably, the same bolts 25 are used to attach the brake drum and the mounting plate 24 for the wheel rims to the wheel hub flange 17. The brake drum 35 includes an annular outer casing 36 whose axially outward end is turned in to provide a radially disposed, annular end wall 37. This end wall 37 is welded at 38 to an annular, axially projecting extension 39 integral with the flange 34. The outer casing 36 supports a frictionally-engageable, annular body 40 having a cylindrical inside periphery.

Figure 2:
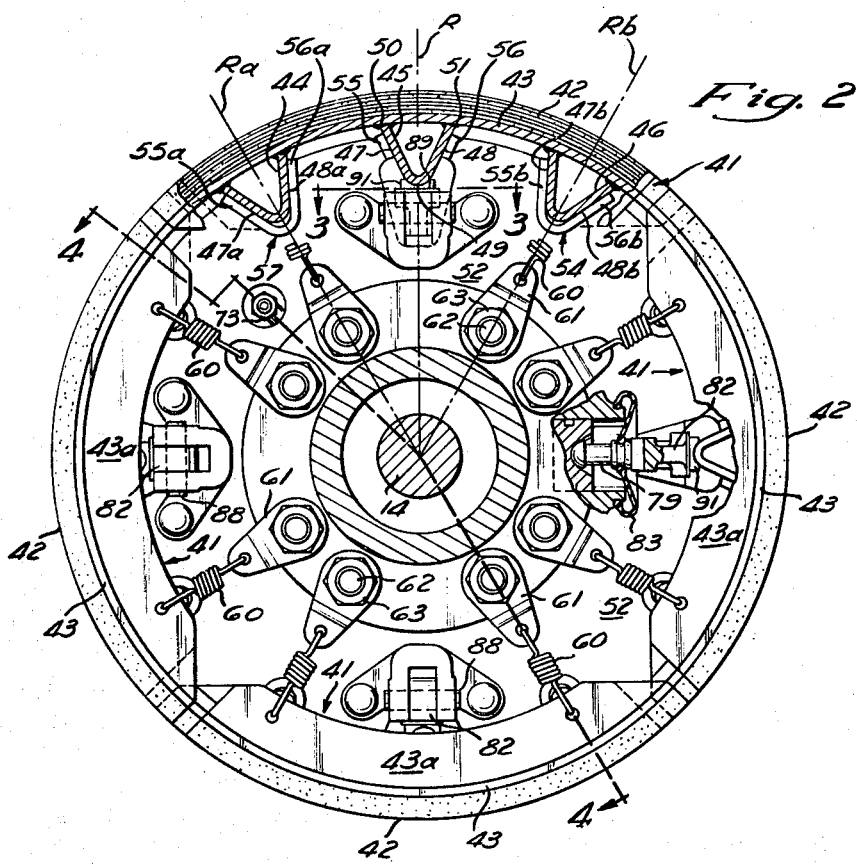
FIGURE 2 is an end elevational view of the FIG. 1 brake, with parts broken away for clarity.

The present brake has a plurality of radially expandable arcuate brake shoes for frictional engagement with the inside of the brake drum body 40. As shown in FIG. 2, preferably there are four such brake shoes 41, each having a braking surface with an arcuate extent of substantially 90° circumferentially along the inside braking surface of the brake drum 35, so that the four brake shoes together can engage substantially the entire braking surface of the drum. The opposite circumferential ends of each brake shoe are inclined at an acute angle to the axis of the brake, so that they overlap when viewed endwise.

Referring to FIG. 2, each brake shoe 41 has an outwardly disposed, arcuately extending, laminated liner 42 of suitable friction material attached to a rigid, arcuate, metal backing plate 43. The backing plate 43 carries three circumferentially spaced, inwardly projecting lugs 44, 45, and 46, which are generally V-shaped in cross-section. The lugs 44 and 46 are located toward the opposite circumferential ends of the brake shoe, and the lug 45 is located midway along the circumferential extent of the brake shoe. Each of these lugs is welded or otherwise rigidly attached to the radially inward side of the backing plate 43 on the brake shoe.

The middle lug 45 presents opposite flat side faces 47 and 48 which are inclined outwardly at opposite acute angles to a radial plane R passing through the axis of rotation of the shaft 14 and the brake drum and through the apex 49 of the V at the radially inward end of this lug. This apex 49 and the respective lines of intersection 50 and 51 of these side faces 47 and 48 on lug 45 all extend parallel to this axis of rotation, and the plane of each side face 47 and 48 on lug 45 extends parallel to this axis of rotation. Preferably, the opposite side faces 47, 48 on lug 45 extend at opposite 25 degree angles to the radial plane R.

The lugs 44 and 46 are identical in construction to the lug 45, with oppositely inclined, flat, opposite side faces which are given the same reference numerals as those for lug 45, but with suffixes "a" and "b" added, respectively. The opposite side faces 47a and 48a on lug 44 extend at opposite acute angles to a radial plane Ra passing through the apex of this lug and through the axis of rotation of the brake drum, and the respective planes of these side faces extend parallel to this axis. Similarly, the opposite side faces 47b and 48b on lug 46 extend at opposite acute angles to a radial plane Rb passing through the apex of this lug and through the axis of rotation of the brake drum, and the respective planes of these side faces extend parallel to this axis.

Each of the lugs 44, 45, 46 has its opposite axial ends welded to the respective opposite end plates 43a and 43b of the brake shoe, as shown in FIG. 4. These end plates are welded to the radially inward side of the backing plate 43 of that wear shoe.

The present brake includes a rigid, annular, radially disposed, reaction plate 52 (FIG. 1), which has a close, sliding fit on the axle 11 and abuts endwise against an integral radial flange 53 on the axle. This reaction plate carries a plurality of circumferentially spaced, generally V-shaped pieces near its outer periphery which define outwardly-facing, V-shaped recesses for receiving the respective end lugs 44 and 46 on the brake shoes.

Referring to FIG. 2, one of these V-shaped pieces 54 presents opposite, flat, oppositely outwardly inclined side walls 55b and 56b whose inside faces extend parallel to, and are slidably engaged by, the outer side faces 47b and 48b respectively on the brake shoe lug 46. As best seen in FIG. 4, this V-shaped piece 54 has an appreciable extent longitudinally or axially of the brake assembly.

Another of these V-shaped pieces 57 presents similar, oppositely inclined side walls 55a and 56a for engagement respectively with the outer side faces 47a and 48a of the lug 44 near the opposite end of this brake shoe.

The reaction plate 52 also carries a pair of flat, oppositely inclined pieces 55 and 56 for engagement with the outer side faces 47 and 48 of the middle lug 45 on the same brake shoe.

The reaction plate 52 provides a similar arrangement of three V-shaped recesses at each of the remaining three brake shoes for snugly, but slidably, receiving the three circumferentially-spaced lugs on the respective brake shoe.

As best seen in FIG. 4, each of the lugs 44 on the brake shoes has an opening 58 therein for slidably receiving a peripheral extension 59 of the reaction plate 52 to facilitate the proper location of the respective brake shoes with respect to the reaction plate.

A similar slidably interfitting arrangement is provided at the lug 46 on each of the brake shoes.

A pair of return springs are provided at each of the end lugs 44 and 46 on each brake shoe to bias the respective brake shoe radially inward to a retracted position away from frictional engagement with the brake drum. Referring to FIG. 4, this return spring arrangement includes a first tension spring 60 having its outer end attached to the end plate 43a of the brake shoe and its inner end attached to a respective bracket 61 attached to the flange 53 on the axle 11 by a bolt and nut assembly 62, 63. At the opposite axial end of this brake shoe lug 44, a second tension spring 64 has its outer end attached to the end plate 43b of the brake shoe and its inner end attached to an annular body 65, which is clamped axially against the opposite face of the reaction plate 52 from the axle flange 53 by the same bolt and nut assembly 62, 63.

A similar return spring arrangement is provided at the opposite end lug 46 on each of the four brake shoes.

The annular body 65 has a snug, sliding fit on the outside of the axle 11, abutting endwise against the reaction plate 52, as just stated. Preferably, this annular body 65 is a one-piece casting and it is machined to provide four circumferentially-spaced cylinder bores 66 (FIG. 1), which are open at the radially outward periphery of this body. A respective piston 67 is slidably received in each cylinder bore 66 and preferably this piston carries a sealing ring 68 on its periphery for sealing engagement with the cylinder bore.

The annular body 65 has a circumferentially extending annular passageway 69 which is connected to each of the cylinder bores 66 by a respective radial bore 70 and longitudinal passage 71. This annular passageway 69 is closed at the outer periphery of body 65 by a ring 72 engaged axially between the reaction plate 52 and an annular shoulder 65a on body 65. As best seen in FIG. 4, this passageway 69 receives suitable hydraulic fluid from an inlet-outlet fitting 73 through a radial bore 74, a connecting longitudinal passage 75, and a connecting radial passage 76 in the annular body 65. Due to the provision of this passageway 69, all of the cylinder bores 66 are interconnected to operate at the same hydraulic fluid pressure.

Each piston 67 presents at its outer face a recess or depression 77 which is spherical at the bottom for receiving the complementary ball-shaped inner end 78 of a radially extending rod 79. This rod has a cylindrical outer end 80 which seats in a complementary recess 81 on a lever 82. A flexible annular diaphragm 83 of rubber or rubber-like material is secured to the annular body 65 around the outside of the cylinder bore 66 and to the outside of the rod 79 to provide a seal for the outer end of the cylinder bore 66.

Figure 3:
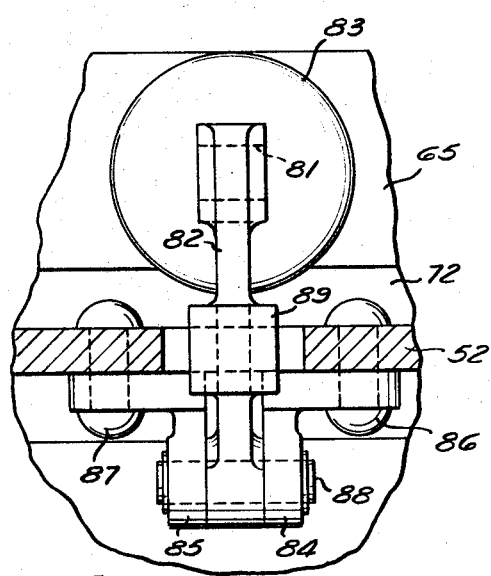
FIGURE 3 is an enlarged detail view showing one of the brake-operating levers in the FIG. 1 brake.

The opposite axial end of lever 82 fits between a pair of mounting brackets 84 and 85 (FIG. 3), which are rigidly attached by rivets 86, 87, to the reaction plate 52. This end of lever 82 is pivotally connected to these brackets by a hinge pin 88.

Midway between its ends the lever 82 has a transverse enlargement 89 presenting a convex outer face 90, as shown in FIG. 1. This face 90 on the lever engages a wear plate 91, which is attached to the apex 49 of the middle lug 45 on the respective brake shoe, as shown in FIG. 2.

With this arrangement, when the driver applies the brake pedal, suitable hydraulic pressure fluid is introduced into the bottom of each cylinder bore 66, and the resultant outward movement of the piston 67 in that cylinder bore is transmitted through the rod 79 and the pivoted lever 82 to the respective brake shoe 41 to force the latter radially outward into frictional engagement with the inside of the brake drum.

As already stated, the pressure in the several cylinder bores 66 is equalized by the provision of the annular passage 69 in the annular body 65 which interconnects them. All of the cylinder bores and pistons are located close to the axle 11 and away from the frictionally-engaging parts of the brake, so that the heat generated by such frictional engagement does not affect substantially the hydraulic operation of the pistons. Also, the fact that the passages interconnecting the cylinder bores 66 are all in the relatively massive annular body 65 minimizes the effect which external heat can have on the hydraulic fluid in these passages, as well as simplifying the manufacture and assembly of the brake.

When the brake is applied, assuming that the brake drum is rotating clockwise in FIG. 2, the rotating drum will tend to pull each brake shoe circumferentially in the same direction (clockwise). When this happens, the surfaces 48a, 48 and 48b on the respective brake shoe lugs 44, 45 and 46 which are inclined in this circumferential direction, slide over the respective inclined walls 56a, 56 and 56b carried by the fixed reaction plate 52. Consequently, as each brake shoe moves radially outward it also moves generally circumferentially in the direction of the brake drum rotation for self-energizing braking engagement with the brake drum. These slidably engaging surfaces on the brake shoe lugs and the reaction plate sustain the braking torque, and because of their locations toward the opposite circumferential ends and at the middle of the brake shoe they effectively prevent it from cocking or tilting. Consequently, the braking force is applied substantially uniformly across the circumferential extent of the brake shoe, even though the brake applying force is applied radially to the brake shoe only at the middle of the brake shoe between its opposite circumferential ends.

Conversely, if the brake drum is rotating in the opposite direction (counterclockwise in FIG. 2) the opposite brake shoe lug surfaces 47a, 47 and 47b slide over the respective walls 55a, 55, and 55b carried by the reaction plate 52 in the same manner for self-energizing braking action.

Figure 5:
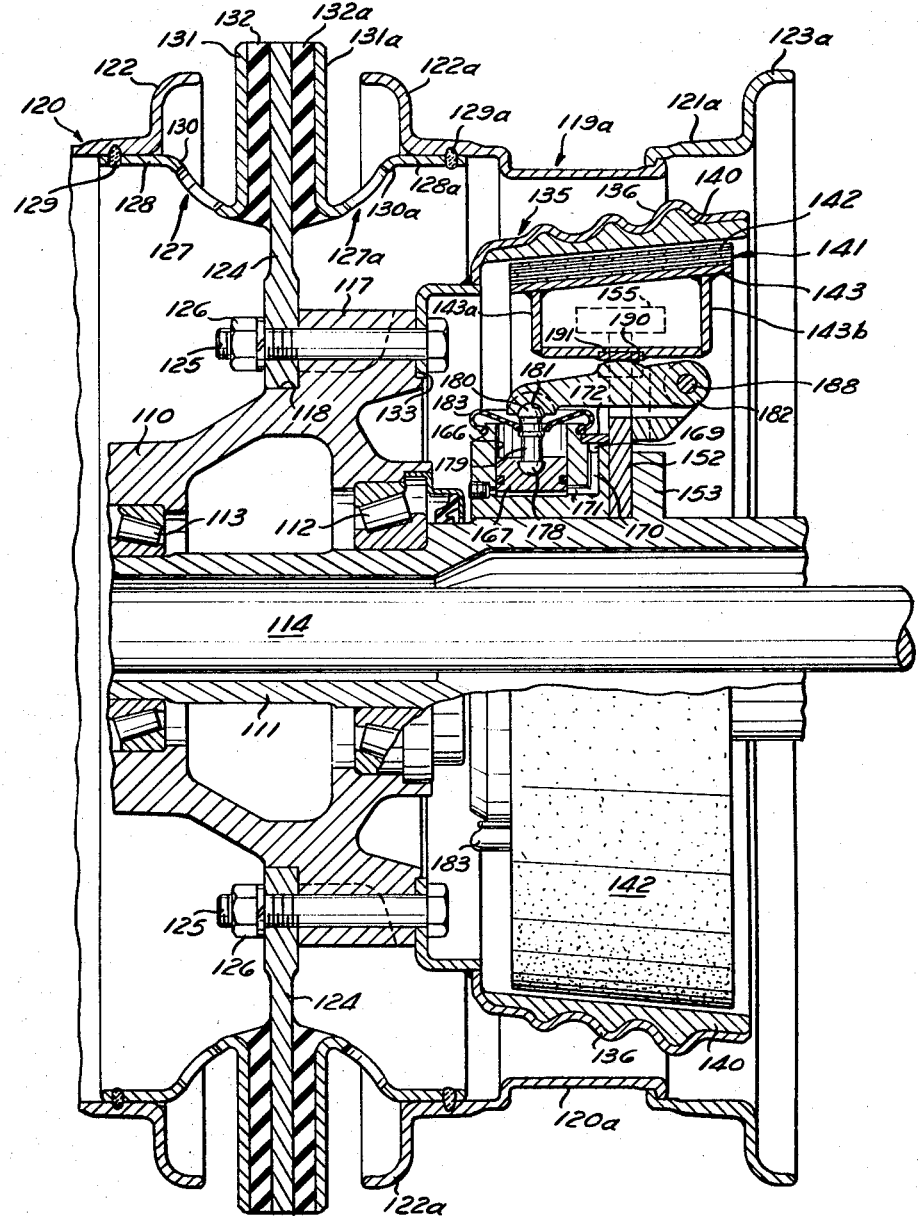
FIGURE 5 is a view similar to FIG. 1 and showing a second embodiment of the present brake.

FIGURES 5 and 6 show a second embodiment of the present invention which is generally similar to the just-described first embodiment, shown in FIGS. 1–4. Corresponding elements of this second embodiment have the same reference numerals plus 100 as those of the first embodiment, and the description of these elements will not be repeated.

In accordance with this second embodiment, both the frictionally-engageable body 140 of the brake drum and the friction liner 142 and backing plate 143 of each brake shoe are inclined radially outward in the axial direction toward the open end of the brake drum. That is, the brake drum body 140 has a frusto-conical inner surface, instead of a cylindrical surface, as in the embodiment of FIGS. 1–4. Each arcuate brake shoe 141 has a similar configuration of its frictionally engageable outside surface. With this arrangement any water, dirt or other foreign matter which may get into the brake tends to be thrown out of the brake by centrifugal force through the open end of the brake drum.

In other respects the brake of FIGS. 5 and 6 is the same as that of FIGS. 1–4, and therefore it is unnecessary to repeat the description of its operation.

FIGURES 7 and 8 illustrate a parking brake in accordance with the present invention, shown embodied in a brake essentially similar to that of FIGS. 5 and 6. However, it is to be understood that this parking brake may be embodied in a brake of the type shown in FIGS. 1–4, if desired. Corresponding elements of the brake pedal actuated, hydraulically-operated parts of this brake have the same reference numerals plus 200 as those of the brake of FIGS. 1–4, and the description of these similar parts will not be repeated.

Referring to FIG. 8, each of the piston-operated levers 282 has an extension 292 at the opposite axial side of its pivot pin 288 from the respective hydraulically-operated piston 267 and rod 279. At its outer end this lever extension 292 carries a roller 293. Each of these rollers 293 engages the inside of a peripheral flange 294 on a rotatable cam member 295. This cam member 295 is mounted on a sleeve bearing 296, which is rotatably mounted on the outside of the axle 211. This sleeve bearing is positioned axially by a pair of thrust washers 297, 298 and locking rings 299, 300 at its opposite ends.

As shown in FIG. 7, a cable 301 is pivotally connected at one end by a pivot pin 302 to the cam member 295 near its periphery. The opposite end of this cable may be connected to a manually-operated parking brake handle or a parking brake pedal which is accessible to the driver of the vehicle. As shown in FIG. 7, the roller-engaging peripheral flange 294 on cam member 295 is unequally spaced from the axis of rotation of the cam at different locations along its circumference, so that it provides four "dwell" portions spaced apart 90° circumferentially at the maximum distance from the axis of rotation, and between these dwell portions it presents "rise" portions which are progressively closer to the axis of rotation, proceeding circumferentially along this flange in either direction away from each "dwell" portion.

FIGURE 7 shows the position of cam member 295 in which the four "dwell" portions on its peripheral flange 294 engage the rollers 293 on the respective brake operating levers 282. In this position, as shown in FIGURE 8, the levers 282 are in their retracted positions, permitting the return springs 260 to position the brake shoes retracted radially inward from the brake drum.

Normally, the driver will want to apply the parking brake immediately after he has brought the vehicle to a stop by applying the brake pedal to operate the brake hydraulically through the pistons 267, rods 279 and levers 282. This action will have pivoted the levers 282 counterclockwise in FIG. 8 from the positions shown there. Now the driver may pull on the cable 301 to turn the cam member 295 clockwise in FIG. 7, causing "rise" portions of the peripheral flange 294 on this cam member to engage the rollers 293 and lock the levers 282 in this brake-applying position. This may be done with very little effort on the driver's part since it merely involves mechanically locking the levers 282 in the brake-applying positions to which they have been already actuated hydraulically.

While certain presently-preferred embodiments of the present brake have been described in detail and illustrated in the accompanying drawing, it is to be understood that various modifications, omissions and adaptations which differ from the disclosed embodiments may be adopted without departing from the scope of this invention.

I claim:

1. In a brake having a brake drum and a plurality of arcuate brake shoes for engagement with said drum, the improvement which comprises:

a fixed reaction member;

and confronting pairs of slidably engaging surfaces on said reaction member and on each brake shoe on opposite sides of the circumferential centerline of the brake shoe, the confronting surfaces of each pair sloping in the same direction circumferentially to provide self-energizing braking action of the respective brake shoe.

2. A brake according to claim 1 wherein:
said reaction member presents a plurality of circumferentially spaced, outwardly sloping walls, each defining one of said confronting surfaces of the respective pair;
and each brake shoe has inwardly projecting lugs located toward the opposite circumferential ends of the brake shoe, said lugs having outwardly sloping faces, each defining the remaining confronting surface of the respective pair.

3. A brake according to claim 2 and further comprising means for applying to each brake shoe a brake-engaging force circumferentially between said lugs.

4. In a brake having a rotatable brake drum, and a plurality of arcuate brake shoes which are radially expandable outwardly into frictional engagement with said drum; the improvement which comprises:
a fixed reaction member positioned inside said drum and presenting a plurality of circumferentially spaced, outwardly facing recesses, each defined by opposite walls which slope outward toward the brake drum in opposite directions circumferentially;
and each brake shoe having inwardly projecting lugs located toward the opposite circumferential ends of the brake shoe and each received in a respective recess on said reaction member, each of said lugs having opposite side faces which slope outward toward the brake drum in opposite circumferential directions and which extend parallel to, and in slidable engagement with, the respective walls of the respective recess.

5. A brake according to claim 4 and further comprising:
a middle lug on each wear shoe located substantially midway between its opposite circumferential ends and projecting inwardly into a respective recess on said reaction member, said middle lug having opposite sides which slope outward in opposite circumferential directions and which extend parallel to, and in sliding engagement with, the walls of said respective recess.

6. A brake according to claim 5 and further comprising:
means for applying a radially outwardly-directed force on each brake shoe at said middle lug thereon to force the brake shoe outward into frictional engagement with the brake drum.

7. A vehicle brake for use on a wheel mounted on an axle of the vehicle, said brake comprising:
a brake drum for attachment to the wheel;
an annular body dimensioned to fit over the outside of the axle at the inside of the brake drum, said annular body having a plurality of radially disposed cylinder bores therein;
pistons slidable in said cylinder bores for movement radially outward in response to fluid pressure in said bores;
a plurality of arcuate brake shoes at the inside of said brake drum coupled to said pistons for movement outward by the latter into frictional engagement with the brake drum;
a plurality of pivoted levers, each acting against a respective brake shoe and being movable by a respective piston to move the respective brake shoe outward into frictional engagement with the brake drum;
and rotatable cam means at the opposite axial end of said levers from said pistons, said cam means being rotatable from a first position permitting said levers to assume an inwardly retracted position to a second position for holding said levers outward to maintain the respective brake shoes in frictional engagement with the brake drum.

8. A vehicle brake according to claim 7, wherein each lever has a roller on said last-mentioned end thereof, and said cam means is a cam member which is rotatable on the axle and has a peripheral flange engaging said rollers, said flange having successive portions along its circumferential extent unequally spaced from the rotational axis of the cam member.

9. A vehicle brake for use on a wheel mounted on an axle of the vehicle, said brake comprising:
a brake drum for attachment to the wheel;
an annular body dimensioned to fit over the outside of the axle at the inside of the brake drum, said annular body having a plurality of radially disposed cylinder bores therein;
pistons slidable in said cylinder bores for movement radially outward in response to fluid pressure in said bores;
a plurality of arcuate brake shoes at the inside of said brake drum coupled to said pistons for movement outward by the latter into frictional engagement with the brake drum;
a fixed reaction member for attachment to the axle inside the brake drum, said reaction member presenting a plurality of circumferentially spaced, outwardly-facing recesses each defined by opposite walls which slope outward toward the brake drum in opposite circumferential directions;
and inwardly projecting lugs on each brake shoe located toward the opposite circumferential ends of the respective brake shoe and each received in a respective recess on said reaction member, each of said lugs having opposite side faces which slope outward toward the brake drum in opposite circumferential directions and which extend parallel to, and in slidable engagement with, the respective walls of the respective recess.

10. A vehicle brake for use on a wheel mounted on an axle of the vehicle, said brake comprising:
a brake drum for attachment to the wheel;
an annular body dimensioned to fit over the outside of the axle at the inside of the brake drum, said annular body having a plurality of radially disposed cylinder bores therein, said annular body having an annular passageway extending circumferentially around said annular body and additional passages connecting said annular passageway to each cylinder bore to equalize the pressures in the cylinder bores;
pistons slidable in said cylinder bore for movement radially outward in response to fluid pressure in said bores;
a plurality of arcuate brake shoes at the inside of said brake drum coupled to said pistons for movement outward by the latter into frictional engagement with the brake drum;
a fixed reaction plate inside the brake drum dimensioned to fit on the axle for attachment to the axle, said reaction plate presenting a plurality of circumferentially spaced, outwardly-facing recesses, each defined by opposite walls which slope outward toward the brake drum in opposite circumferential directions;
and three inwardly projecting lugs on each brake shoe located respectively toward the opposite ends and at the middle of said brake shoe along its circumferential extent, each of said brake shoe lugs being received in a respective recess on said reaction plate and having opposite side faces which slope outward toward the brake drum in opposite circumferential directions and which extend parallel to, and in sliding engagement with, the respective walls of the respective recess.

11. A vehicle brake for use on a wheel mounted on an axle of the vehicle, said brake comprising:
a brake drum for attachment to the wheel;
an annular body dimensioned to fit over the outside of the axle at the inside of the brake drum, said annular body having a plurality of radially disposed cylinder bores therein, an annular passageway extending circumferentially around the outside of said body and additional passages connecting said annular passageway to said cylinder bores to equalize the pressure therein, and a ring extending circumferentially around said body and closing said annular passageway at the periphery of said body;

pistons slidable in said cylinder bores for movement radially outward in response to fluid pressure in said bores;

and a plurality of arcuate brake shoes at the inside of said brake drum coupled to said pistons for movement outward by the latter into frictional engagement with the brake drum.

References Cited

UNITED STATES PATENTS

| | | |
|---|---|---|
| 1,962,939 | 6/1934 | Roberts. |
| 2,256,498 | 9/1941 | Sauzedde. |
| 2,435,977 | 2/1948 | Morgan. |
| 2,538,997 | 1/1951 | Weiland. |
| 2,759,568 | 8/1956 | Fawick. |
| 3,137,367 | 6/1964 | Faul _____ 188—70 |

DUANE A. REGER, *Primary Examiner.*